United States Patent
McNamara et al.

(10) Patent No.: US 9,349,123 B1
(45) Date of Patent: May 24, 2016

(54) HYBRID NATIVE NETWORKED APPLICATION

(71) Applicant: Amazon Technologies, Inc., Reno, NV (US)

(72) Inventors: Alexander Michael McNamara, Seattle, WA (US); Shao-En Yu, Seattle, WA (US); Eitan S. Levi, Seattle, WA (US); Stephen D. Avalone, Seattle, WA (US); Sohel R. Ahuja, Bellevue, WA (US); Ajay M. Desai, Bellevue, WA (US); Guillaume A. Theoret, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 202 days.

(21) Appl. No.: 13/644,746

(22) Filed: Oct. 4, 2012

(51) Int. Cl.
*G06Q 20/32* (2012.01)
*G06Q 30/06* (2012.01)

(52) U.S. Cl.
CPC .............. *G06Q 20/322* (2013.01); *G06Q 30/06* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 5,745,681 A * | 4/1998 | Levine et al. | 709/200 |
| 7,315,830 B1 * | 1/2008 | Wirtz et al. | 705/14.1 |
| 7,346,543 B1 * | 3/2008 | Edmark | 705/27.2 |
| 8,121,900 B1 * | 2/2012 | Gulten et al. | 705/27.2 |
| 2002/0072980 A1 * | 6/2002 | Dutta | 705/26 |
| 2003/0137540 A1 * | 7/2003 | Klevenz et al. | 345/762 |
| 2003/0167296 A1 * | 9/2003 | Todd, II | 709/203 |
| 2009/0276407 A1 * | 11/2009 | Van Vleet et al. | 707/3 |
| 2010/0191856 A1 * | 7/2010 | Gupta et al. | 709/228 |
| 2013/0159856 A1 * | 6/2013 | Ferren | 715/716 |
| 2013/0222423 A1 * | 8/2013 | Fields et al. | 345/629 |

* cited by examiner

*Primary Examiner* — Chris Parry
*Assistant Examiner* — Stephen Houlihan
(74) *Attorney, Agent, or Firm* — Thomas | Horstemeyer, LLP

(57) ABSTRACT

Disclosed are various embodiments for a hybrid networked application. An application context communicates with a thin client application. The application context maintains a navigation state and manages previously loaded content to simulate a native application experience. Navigation contexts facilitate the search and discovery of information. Overlays facilitate the discovery and rendering of item details.

23 Claims, 5 Drawing Sheets

HYBRID NATIVE NETWORKED APPLICATION

BACKGROUND

Native applications allow for developers to take advantage of advanced user interface elements and state management. Problems arise when the native application interacts with services using tightly coupled data and presentation layers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
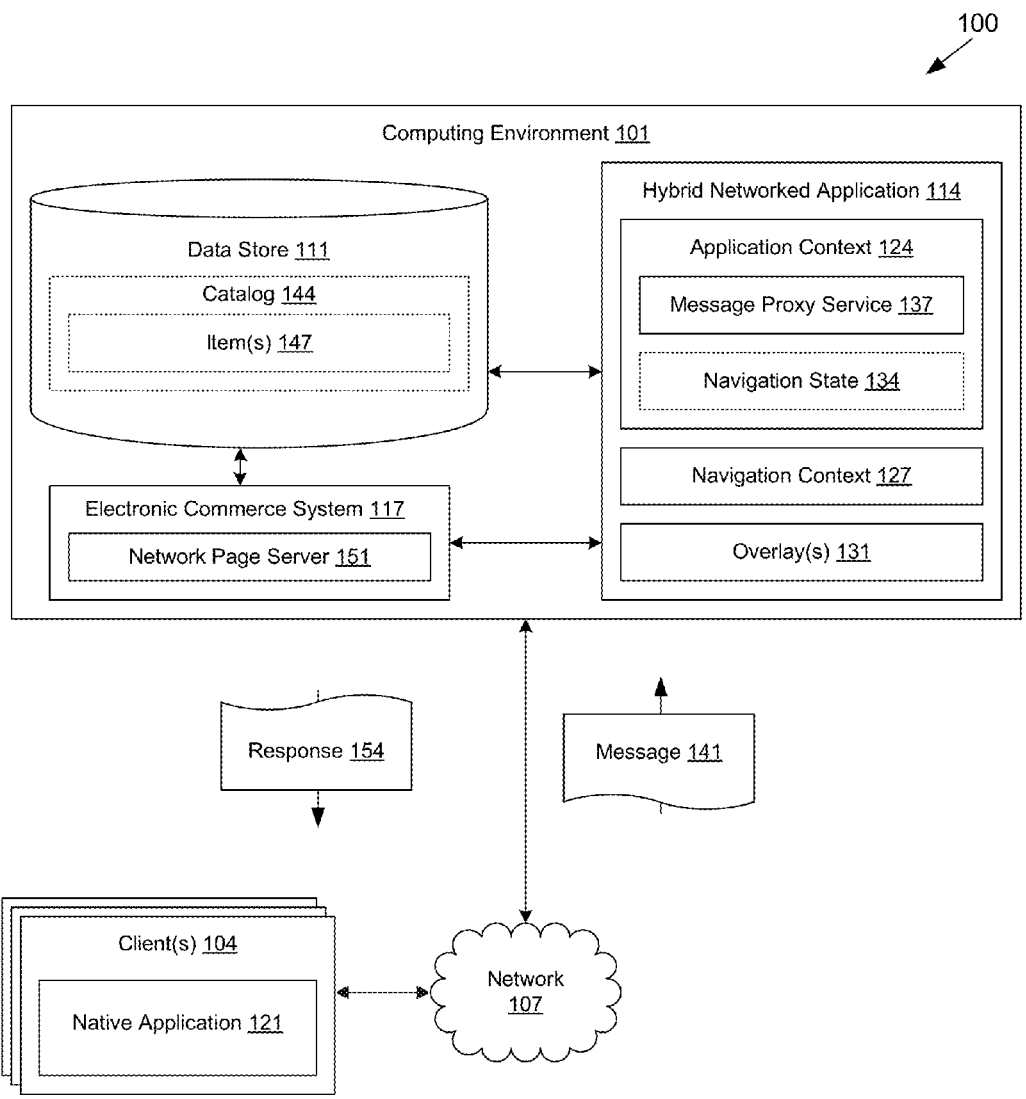
FIG. 1 is a drawing of a networked environment according to various embodiments of the present disclosure.

Developers for networked services often create device-specific native applications to interact with the networked services while taking advantage of features made available by native implementations. For example, an electronic commerce system may have a network page server implementation to allow users to access the system using a browser or other application. The electronic commerce system may then also develop a native application for execution on a mobile device or other device. The native application would be specifically designed to take advantage of the form factor and interface components specific to the mobile device, such as a touch screen, as well as device or operating system user interface elements such as native menus and animations. Additionally, native applications allow for state management, distinct from the stateless Hypertext Transfer Protocol implementation used for many browser-based networked system interactions.

Native applications also have disadvantages compared to a browser-based access method. Tightly coupled data and presentation layers can increase the difficulty of delivering content consistent with the content delivered via network page servers. New features implemented in the system are immediately available to browser-based users following deployment. For native application users, the user will typically have to download an updated version or patch for the application to access the new features.

A hybrid native networked application can allow for developers and users to take advantage of many of the features made available by native applications and browser-based system access. A thin native application allows developers to implement native user interface elements such as menus, as well as native operating system or device features such as notification and search services. Additional native elements which may be accessed by the native application include internal and external hardware devices, or other applications concurrently executed on the same client device. By implementing a thin native application, leaving server-side functionality to manage state and content, the user will be able to access newly deployed functionality without requiring an update of the native application, minimizing the overall amount of required updates.

A server side application context can manage the navigation state of the system with respect to the native application users. This allows for state management with respect to native application users unavailable to stateless browser-based users. The application context can also serve as a message proxy service between the native application and other application layers such as a navigation context, implemented for search and content discovery, and overlays, implemented to facilitate the rendering of detailed information by the native application.

Additionally, multiple instances of the hybrid native networked application may be executed concurrently to perform NB testing, split testing, or other quality assurance testing with respect to different sessions executed on the native application. The multiple instances may comprise identical or different versions of the hybrid native networked application.

In the following discussion, a general description of the system and its components is provided, followed by a discussion of the operation of the same.

With reference to FIG. 1, shown is a networked environment 100 according to various embodiments. The networked environment 100 includes a computing environment 101, and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include a hybrid networked application 114, an electronic commerce system 117, and other applications, services, processes, systems, engines, or functionality not discussed in detail herein.

The hybrid native application 114 is executed to facilitate interactions between a native application 121 executed on a client 104 and the electronic commerce system 117. The hybrid native application 114 may comprise an application context 124, a navigation context 127, and one or more overlays 131, as well as other data or functionality. The application context 124 maintains a navigation state 134 with respect to the native application 121. The navigation state 134 may comprise information relating to currently viewed content, as well as previously loaded and previously viewed content. The navigation state 134 may also comprise an ordered or unordered browsing history with respect to the native application 121 in order to facilitate backtracking to a previous navigation state 134. For example, the navigation state 134 may include a navigation stack of previous navigation states 134 or events, an overlay 131, or other content. In addition to maintaining the navigation state 134, the application context updates the navigation state 134 in response to navigation events triggered by the native application 121, the navigation context 127, or the overlays 131.

Additionally, the application context 124 implements a message proxy service 137 to facilitate communication of messages 141 between the native application 121 and the navigation context 127 or overlays 131. Messages 141 may comprise postMessage data or other data. Messages 141 sent by the native application 121 may comprise requests such as search queries, navigation requests to open detail data in an overlay 131, a login or logout, a handshake between the native application and the component contexts of the hybrid networked application 114, or other data. Messages 141 sent to the native application may comprise alerts, indicators to open native user interface elements such as menus or client 104 specific search functionality, or other data. Other functionality may also be implemented by the application context 124, as well.

The navigation context 127 facilitates the search and navigation of content of the electronic commerce system 117 by a user of the native application 121. This may comprise a search of a catalog 144 comprising items 147 available for sale or viewing through the electronic commerce system 117. The navigation context 127 may also communicate messages 141 comprising navigation events to the application context 124 for communication to the native application 121, for updating a navigation state 134, or some other purpose.

Overlays 131 facilitate information discovery by the native application 121. This may comprise generating or otherwise accessing detail pages comprising information relating to one or more items 147. Overlays 131 may also trigger navigation events through the application context 124 such as a login event, or trigger other overlays 131. Additionally, overlays 131 may facilitate a comparison of details corresponding to two or more items 147 responsive to a user interface event triggered by the user of the native application. For example, the user may select a first rendered overlay 131 corresponding to a first item 147 and drag the first overlay 131 on top of a second overlay 131 to initiate a comparison of the corresponding items 147. The overlays 131 may also embody actionable content with respect to a user interface rendered by a native application 121 such as a frame or other user interface element. Other functionality may also be implemented by overlays 131.

The electronic commerce system 117 is executed in order to facilitate the online purchase of items 147 over the network 107 The electronic commerce system 117 also performs various backend functions associated with the online presence of a merchant in order to facilitate the online purchase of items 147 as will be described. For example, the electronic commerce system 117 generates network pages such as web pages or other types of network content that are provided to clients 104 by a network page server 151 for the purposes of selecting items for purchase, rental, download, lease, or other form of consumption as will be described.

The data stored in the data store 111 includes, for example, a catalog 144 comprising items 147, and potentially other data. The catalog 144 implements an organization of items 147 available for purchase or rental through the electronic commerce system 117.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a native application 121 and/or other applications. The native application 121 may be executed in a client 104 for example, to access network content served up by the computing environment 101 and/or other servers. Additionally, the native application 121 is configured to communicate messages 141 to the hybrid networked application 114 via the message proxy service 137. The native application 121 may also obtain responses 154 from the hybrid networked application 114. The response 154 may comprise messages 141 to initiate an alert or render a native user interface element on the client 104. The response 154 may also comprise content for rendering by the native application 121 such as search results or item 147 details from the electronic commerce system 117. The response 154 may comprise other data as well.

The native application 121 may also maintain a global state which is updated during navigation and overlay 131 events by the application context 124. The global state may comprise a saved navigation state 134. This saved navigation state 134 may be communicated to the application context 124 to generate a current navigation state 134 in the application context 124.

Next, a general description of the operation of the various components of the networked environment 100 is provided. To begin, the native application 121 communicates a message embodying a handshake to be communicated to the navigation context 127 and the overlays 131. This may comprise communicating the message 141 to the message proxy service 137 of the application context 124 for forwarding to the navigation context 127 or the overlay 131. The handshake message 141 may also be communicated by another approach as well.

After the handshaking between the native application 121 and the hybrid networked application 114 is complete, the application context 124 generates a starting navigation state 134 embodying a current workflow state with respect to the native application 121 interactions with the electronic commerce system 117. Generating the starting navigation state 134 may comprise generating a new navigation state as a function of default parameters, user account information with respect to a user of the native application 121, or other data. Generating the starting navigation state 134 may also comprise obtaining a previously saved navigation state 134 from the native application 121 to allow the native application 121 to resume from a previous point in the workflow. The starting navigation state 134 may also be generated by another approach.

Next, the client 104 will begin interactions with the electronic commerce system 117 via the native application 121 and the hybrid networked application 114. Interactions are performed by communicating messages 141 to the hybrid networked application 114 via the message proxy service 137 of the application context 124. The message proxy service 137 then forwards the messages 141 to the appropriate component such as the navigation context 127 and the overlays 131.

For example, the client 104 may wish to perform a search of the catalog 144 for one or more items 147. This interaction may comprise communicating a message 141 embodying a search query or request to the navigation context 127. The navigation context 127 may then generate a navigation event as a message 141 communicated to the application context 124 to update the navigation state 134 so as to embody the current searching stage of the workflow.

In such an embodiment, updating the current navigation state 134 may comprise the navigation context 127 generating search results comprising a list of one or more items 147. Generating the search results may be facilitated by search algorithms or other functionality implemented in the electronic commerce system 117, the catalog 144, or other data. The current navigation state 134 will further comprise these search results as loaded content.

As another example of an interaction performed by the client 104 with respect to the hybrid networked application 114, the user of the native application 121 may wish to load a product detail page embodying detailed data associated with one or more items 147 stored in the catalog 144. This may comprise generating a message 141 embodying a detail request, which may include a reference to an item 147 obtained from loaded search results, or other identifying data.

The detail request message 141 will be communicated to the message proxy service 137 for communication to an overlay 131. This may comprise generating a new overlay 131, modifying the content of an already created overlay 131, or some other approach. Responsive to the detail request message 141, the overlay 131 may then communicate with the application context 124 to update the navigation state 134 to reflect the requested detail. In such an embodiment, the updated navigation state 134 may include information associated with loaded or opened overlays 131, a currently focused overlay 131, or other data. The loaded or opened overlays 131 may be stored as an ordered collection such as a list or stack, an unordered collection, or by another approach. This may further comprise encoding for rendering by the native application 121 a user interface element embodying the requested product details which is communicated as a response 154. Requested detail may be obtained by the hybrid networked application 114 via interactions with the electronic commerce system 117, items 147 in the catalog 144, or by another approach. Other approaches may also be used to request item 147 details from the hybrid networked application 114.

The client 104 may also initiate a comparison of one or more item 147 details. This may comprise a user interface interaction in which a user interface element embodying an overlay 131 item 147 is selected and dragged onto a second overlay 131 embodying one or more items 147. This interaction would then communicate a message 141 embodying an item 147 comparison to the application context 124. The application context 124 would then load the associated overlays 131 with the item 147 details and update the navigation state 134 to reflect the new overlay 131 collection and overlay 131 focus. Other approaches may also be used to initiate an item 147 comparison.

As interactions cause the navigation state 134 to be updated, the content loaded in response to the navigation events and interactions are maintained in the navigation state 134. For example, previously loaded item 147 details are maintained as a component of the navigation state 134. In response to an interaction requesting previously loaded content, such as an already loaded item 147 detail embodied in the navigation state 134, the application context 124 may generate the current navigation state 134 using the already loaded content instead of loading new content from the data store 111 or electronic commerce system 117. This facilitates more efficient access to data and preserves the workflow of the user of the native application 121.

Additionally, a navigation event may result in the navigation state 134 being updated to reflect a previously encountered navigation state 134. In such an event, the application context 124 may generate the current navigation state 134 in response to the navigation event using data already embodied in the navigation state 134. This may comprise popping elements off a navigation or overlay 131 stack embodied in the navigation state 134, or by another approach.

As the navigation state 134 is updated the native application 121 may save or maintain the navigation state 134. In some embodiments, this may comprise obtaining updates from the application context 124 such that a navigation state 134 maintained by the native application 121 reflects a navigation state maintained by the application context 124. In another embodiment, the application context 124 may initiate a save of the navigation state 134 by the native application 121 at a predefined interval, in response to a native application 121, in response to a predefined condition or event, or by another approach.

Figure 2A:
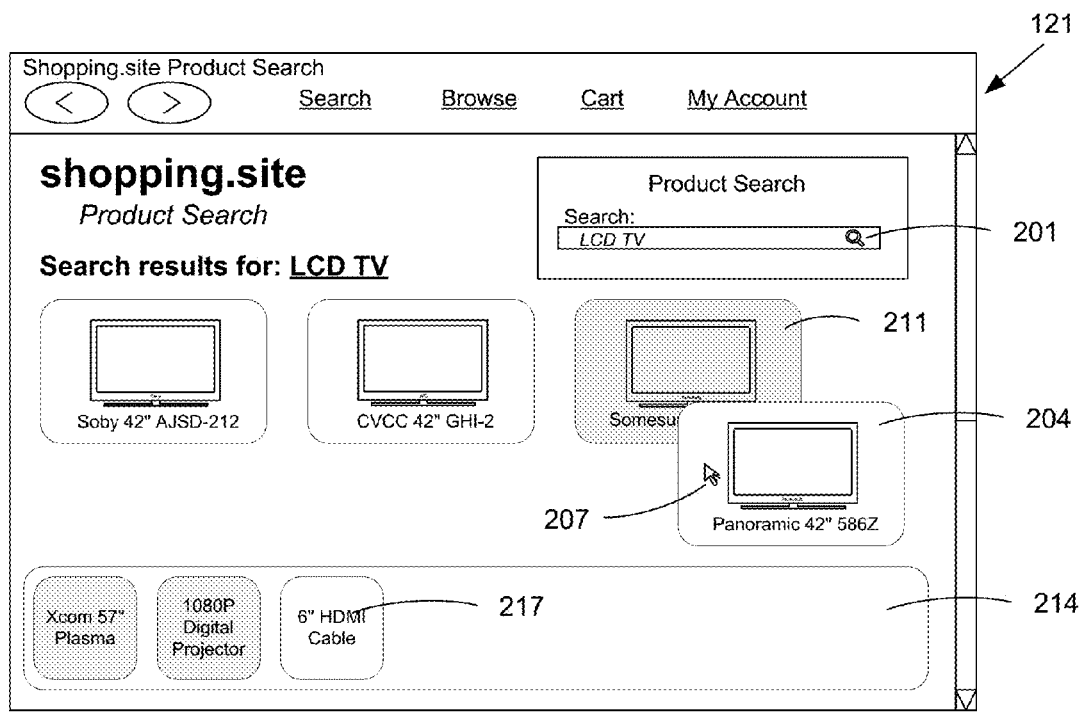
FIG. 2A is a drawing of an example of a user interface rendered by a client in the networked environment of FIG. 1 according to various embodiments of the present disclosure.

Turning now to FIG. 2A, shown is a user interface representing an initiation of an item 147 (FIG. 1) comparison by a user of a native application 121 (FIG. 1). Although the following elements are described as particular user interface elements, it is understood that other user interface elements may also be implemented in the user interface.

Item 201 is a text input to facilitate an initiation of an item 147 search an electronic commerce system 117 (FIG. 1). Item 204 represents a frame embodying a selected item 147 for comparison. Item 204 may correspond to an overlay 131 (FIG. 1) or some other component of the hybrid networked application 114 (FIG. 1). Item 207 is an indicator for targeting a selection of a user interface element. Item 207 may comprise a mouse pointer, a point of contact for a touch screen input, or another input. Item 211 represents a second user interface element embodying an item 147 against which the selected item will be compared. Item 214 is a bar for maintaining user interface elements corresponding to various previously viewed items 147. Items 217 are user interface frames which, when selected, initiate a navigation event to set the current navigation state 134 to embody a focus on the selected item 147 corresponding to the user interface element.

Figure 2B:
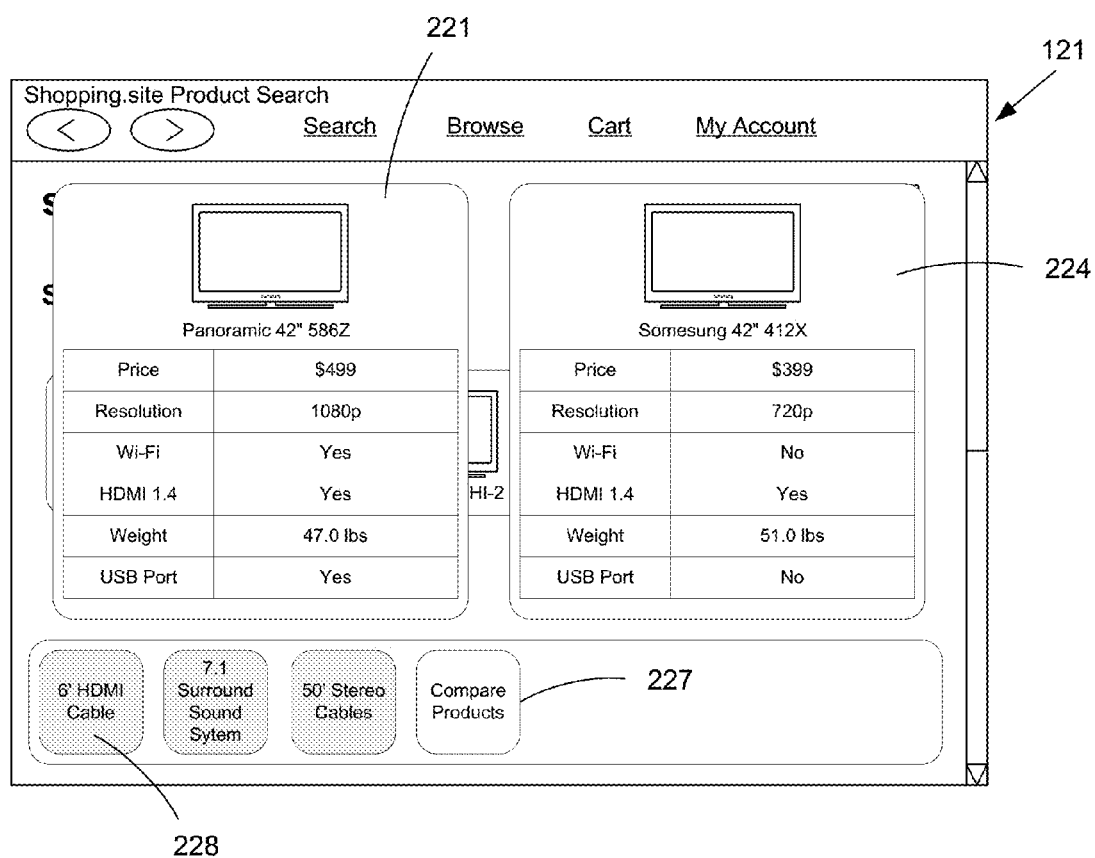
FIG. 2B is a drawing of an example of a user interface rendered by a client in the networked environment of FIG. 1 according to various embodiments of the present disclosure.

Moving on to FIG. 2B, shown is a user interface embodying an item 147 (FIG. 1) comparison rendered by the native application 121 (FIG. 1). Items 221 and 224 are user interface frames each embodying a different item 147 for comparison. Included in items 221 and 224 are product details corresponding to the respective items 147. Items 221 and 224 may correspond to an overlay 131 (FIG. 1), some other component of the hybrid networked application 114 (FIG. 1), or other data.

Item 227 is representative of a user interface frame corresponding to the navigation state 134 (FIG. 1), highlighted to indicate that the current navigation state 134 corresponds to the product comparison. Item 228 is representative of a user interface frame which, when selected, will transition the current navigation state from the item 147 comparison to a selected item 147 corresponding to the user interface element.

Figure 3:
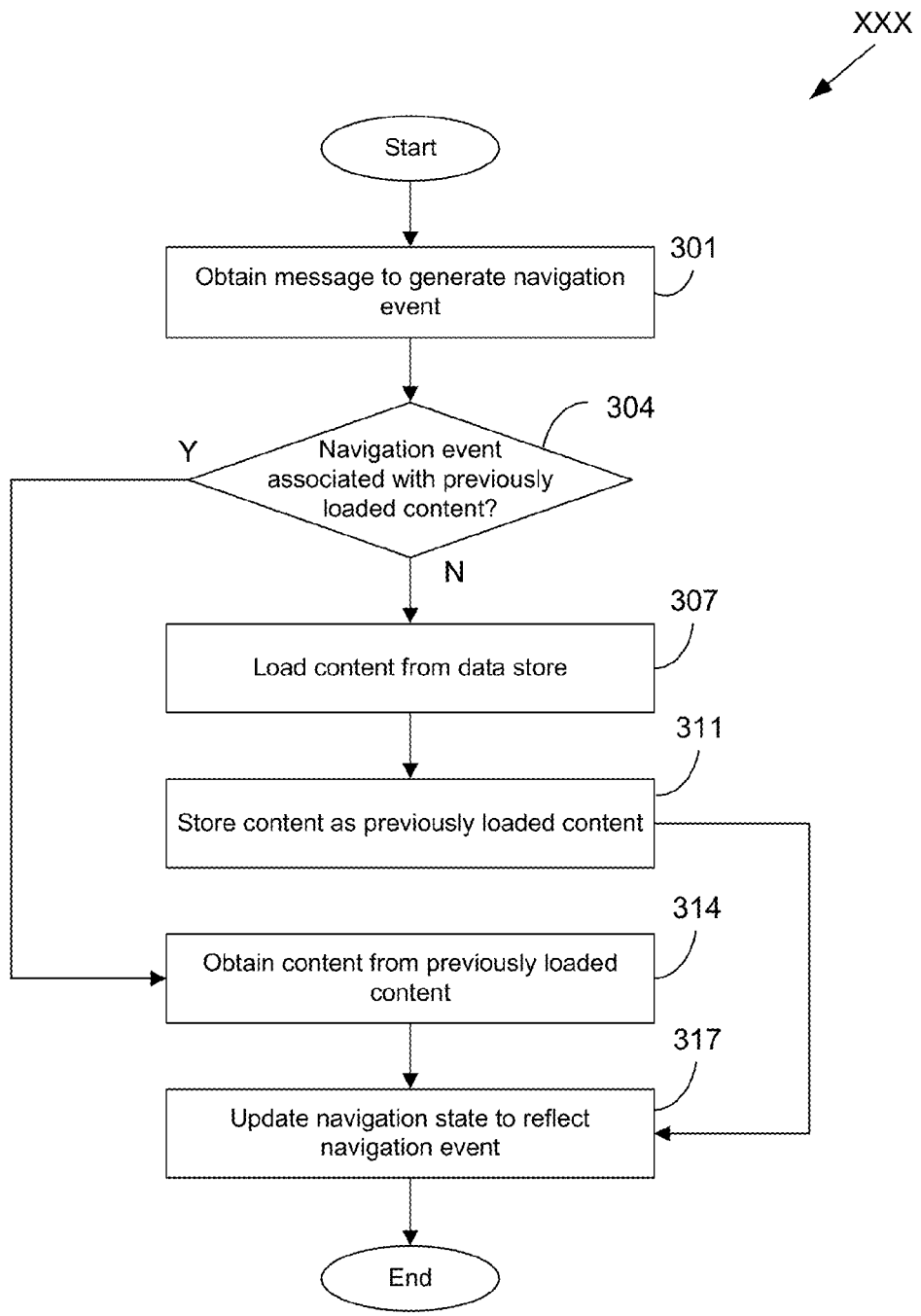
FIG. 3 is a flowchart illustrating one example of functionality implemented as portions of a hybrid networked application executed in a computing environment in the networked environment of FIG. 1 according to various embodiments of the present disclosure.

Referring next to FIG. 3, shown is a flowchart that provides one example of the operation of a portion of the hybrid networked application 114 according to various embodiments. It is understood that the flowchart of FIG. 3 provides merely an example of the many different types of functional arrangements that may be employed to implement the operation of the portion of the hybrid networked application 114 as described herein. As an alternative, the flowchart of FIG. 3 may be viewed as depicting an example of steps of a method implemented in the computing environment 101 (FIG. 3) according to one or more embodiments.

Beginning with box 301, the application context 124 (FIG. 1) obtains a message 141 (FIG. 1) to generate a navigation event. The message may comprise a request to initiate a search of the catalog 144 (FIG. 1) for items 147 (FIG. 1) responsive to a search query. The message 141 may also comprise a request to load a product detail for an item 147 as facilitated by an overlay 131 (FIG. 1). The message 141 may also comprise other data to generate a navigation event with respect to the hybrid networked application 114. Obtaining the message 141 may be facilitated by the message proxy service 137 (FIG. 1), which may then forward the message 141 to a navigation context 127 (FIG. 1) or an overlay 131. Other approaches may also be used to obtain the message 141.

Next, in box 304, the hybrid networked application 114 determines if content to be loaded in response to the navigation event is associated with previously loaded content. This determination may be facilitated by the application context 124. In embodiments in which a message proxy service 137 forwards the message 141 to a navigation context 127 or overlay 131, the determination may also be facilitated by the targeted navigation context 127 or overlay 131. Additionally, the determination may comprise an analysis of a navigation state 134 to determine if the content had been loaded responsive to previous messages 141 or navigation events, or if the message 141 triggers a navigation event which would transition the current navigation state 134 to a previously embodied navigation state. The determination may also be performed by another approach.

In box 307, if the navigation event is not associated with previously loaded content, the content is loaded from the data store 111 (FIG. 1). This may comprise communicating with search functionality of the electronic commerce system 117 (FIG. 1) to generate search results comprising a listing of items 147 stored in the data store 111. This may also comprise loading product details for an item 147 stored in the data store. Other approaches may also be used to load the content from the data store 111.

Next, in box 311, the loaded content is stored as previously loaded content such that future navigation events will not need to access the data store 111 for the loaded content. This may comprise updating or modifying the navigation state 134, a data structure or application accessible to the hybrid networked application 114, or some other approach.

If the navigation event is associated with previously loaded content, for example, a previously embodied navigation state 134, the associated content is loaded from previously loaded content in box 314. This may comprise accessing a data structure or other component of the navigation state 134, or some other approach.

Next in box 317, the navigation state 134 is updated to reflect the current navigation event. In embodiments in which the navigation event is associated with previously loaded content, this may comprise popping items from a navigation stack or overlay 131 stack such that the navigation state 134 embodies a previously embodied navigation state 134. In other embodiments, this may comprise adding items to the navigation stack or overlay 131 stack to reflect the loaded content. Updating the navigation state 134 may be accomplished by other approaches, as well.

Figure 4:
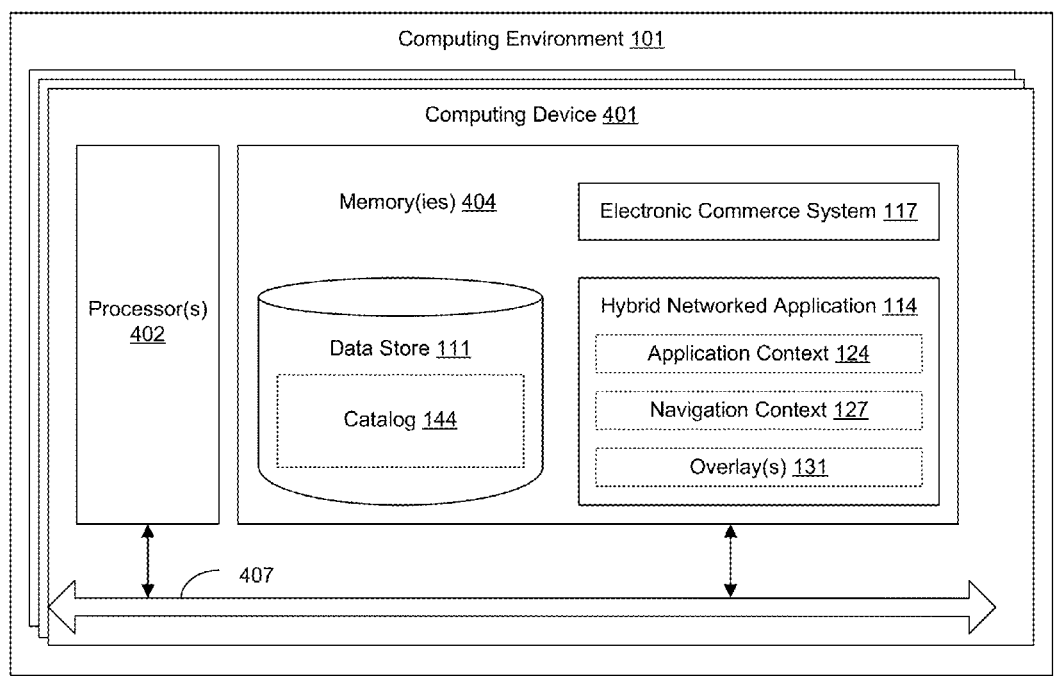
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are an electronic commerce system 117 (FIG. 1) and a hybrid networked application 114 (FIG. 1) having an application context 124 (FIG. 1), navigation context 127 (FIG. 1), and overlays 131 (FIG. 1), and potentially other applications. Also stored in the memory 404 may be a data store 111 (FIG. 1) storing a catalog 144 (FIG. 1) and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although a hybrid networked application 114, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the hybrid networked application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including hybrid networked application 114, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one computing device, the at least one program having instructions that cause the at least one computing device to at least:
   implement a navigation context by:
      responsive to a navigation event triggered by a native application executed on a client device, loading a content from an electronic commerce system associated with the navigation event;
      retaining an amount of previously loaded content, the amount of previously loaded content having been previously loaded by the at least one computing device in response to a previous navigation event triggered by the native application;

wherein the content is loaded from the amount of previously loaded content responsive to the navigation event being associated with the amount of previously loaded content;

implement an application context, by:

maintaining a navigation state associated with the native application executed on the client device, the navigation state indicating a currently viewed content and the previously loaded content;

implementing a proxy to facilitate a communication of at least one postMessage message between the native application and the navigation context;

responsive to the content comprising an item detail, implement at least one overlay for rendering the item detail by the native application;

initiate a save of the navigation state on the client device; and obtain the navigation state from the client device in response to a handshake request from the client device; and load the currently viewed content and the previously loaded content indicated in the navigation state obtained from the client device in response to the handshake request.

2. The non-transitory computer-readable medium of claim 1, wherein the proxy further facilitates a communication of the at least one message from the at least one overlay to the native application.

3. A system, comprising:

at least one computing device configured to at least:

implement a navigation context by:

responsive to a navigation event triggered by a native application executed on a client device, loading a content associated with the navigation event to be communicated to the client device;

retaining an amount of previously loaded content, the amount of previously loaded content having been previously loaded by the at least one computing device in response to a previous navigation event triggered by the native application;

wherein the content is loaded from the amount of previously loaded content responsive to the navigation event being associated with the amount of previously loaded content;

implement an application context to facilitate maintaining a navigation state associated with the native application executed on the client device, the navigation state indicating a currently viewed content and the amount of previously loaded content;

obtain the navigation state from the client device in response to a handshake request from the client device;

load the currently viewed content and the previously loaded content indicated in the navigation state obtained from the client device in response to the handshake request; and implement at least one overlay for rendering the content by the native application.

4. The system of claim 3, wherein implementing the application context further comprises implementing a proxy to facilitate a communication of at least one message between the native application and the navigation context.

5. The system of claim 4, wherein the proxy further facilitates a communication of the at least one message from the at least one overlay to the native application.

6. The system of claim 4, wherein the at least one message is communicated by a postMessage service.

7. The system of claim 3, wherein the content comprises a subset of an electronic catalog implemented in an electronic commerce system.

8. The system of claim 3, wherein the navigation state further comprises at least one currently active overlay.

9. The system of claim 3, wherein the navigation event is a first navigation event, and at least one overlay is capable of triggering a second navigation event.

10. The system of claim 3, wherein the at least one overlay is a first overlay, and the first overlay is capable of triggering a second at least one overlay.

11. The system of claim 3, wherein rendering the content is performed as a function of a plurality of menu elements associated with a client device type.

12. The system of claim 3, wherein the at least one computing device is further configured to at least initiate a save of the navigation state as a saved navigation state stored on the client device.

13. The system of claim 12, wherein the at least one computing device is further configured to at least generate the navigation state as a function of the saved navigation state obtained from the client device.

14. The system of claim 3, wherein the at least one overlay is one of a plurality of overlays, and implementing the application context further comprises encoding for rendering a comparison of the content associated with the plurality of overlays responsive to a selection of the plurality of overlays via the native application.

15. The system of claim 14, wherein the selection comprises a dragging of a first at least one of the overlays onto a second at least one of the overlays.

16. A method, comprising:

loading, by at least one computing device, an amount of content responsive to a navigation event triggered by a native application executed on a client;

storing, by the at least one computing device, the content as one of a plurality of loaded contents, the plurality of loaded contents having been previously loaded by the at least one computing device in response to a plurality of previous navigation events triggered by the native application;

maintaining, by the at least one computing device, a navigation state with respect to the native application executed on the client device as a function of the loaded contents, the navigation state indicating a currently viewed content and the previously loaded contents;

implementing, by the at least one computing device, a proxy to facilitate a communication of at least one message between the native application and a navigation context executed to facilitate a discovery of the content;

encoding, by the at least one computing device, at least one overlay to facilitate a rendering of the content on the client;

obtaining, by the at least one computing device, the navigation state from the client device in response to a handshake request from the client device;

loading, by the at least one computing device, the currently viewed content and the previously loaded contents indicated in the navigation state obtained from the client device in response to the handshake request; and wherein the content is loaded from the loaded contents responsive to the navigation event comprising a request for the loaded contents.

17. The method of claim 16, wherein the native application comprises a thin application configured to interact with controls specific to the client.

18. The method of claim 16, wherein the communication is a first communication, and wherein the proxy further facilitates a second communication of the at least one message from the overlay to the native application.

19. The method of claim 16, wherein the overlay is configured to trigger a navigation event.

20. The method of claim 16, wherein the at least one message comprises a postMessage message.

21. The method of claim 16, further comprising
    initiating, by the at least one computing device, a save of the navigation state as a saved navigation state by the native application, the saved navigation state being stored on the client.

22. The method of claim 16, wherein the at least one overlay is one of a plurality of overlays, and the method further comprises:
    encoding for rendering, by the at least one computing device, a comparison of data embodied in the overlays responsive to the navigation event comprising:
        a selection of a first one of the overlays by a user of the native application; and
        a dragging of the first one of the overlays onto a second one of the overlays by the user.

23. The method of claim 16, wherein the content comprises a subset of an electronic catalog implemented in an electronic commerce system.

* * * * *